United States Patent
Takashima et al.

(10) Patent No.: US 6,815,506 B2
(45) Date of Patent: Nov. 9, 2004

(54) OIL-RESISTANT THERMOPLASTIC ELASTOMER COMPOSITION AND MOLDINGS USING THE SAME

(75) Inventors: Masaaki Takashima, Mie (JP); Katsutaka Yokoi, Mie (JP); Minoru Tsuneyoshi, Mie (JP)

(73) Assignee: JSR Corporation, Tokyo (JP)

( * ) Notice: Subject to any disclaimer, the term of this patent is extended or adjusted under 35 U.S.C. 154(b) by 139 days.

(21) Appl. No.: 10/268,789

(22) Filed: Oct. 11, 2002

(65) Prior Publication Data

US 2003/0096071 A1 May 22, 2003

(30) Foreign Application Priority Data

Oct. 15, 2001 (JP) ..................................... P. 2001-316441

(51) Int. Cl.$^7$ ........................... C08L 33/04; C08L 33/20
(52) U.S. Cl. ....................... 525/221; 525/222; 525/236; 525/238; 525/240; 525/242
(58) Field of Search ................................ 525/221, 222, 525/236, 238, 240, 242

(56) References Cited

U.S. PATENT DOCUMENTS

| | | | |
|---|---|---|---|
| 4,942,202 A | | 7/1990 | Zama et al. |
| 5,010,137 A | * | 4/1991 | Umeda et al. ............... 525/104 |
| 5,268,425 A | * | 12/1993 | Furuta et al. .................. 525/68 |
| 6,458,883 B1 | * | 10/2002 | Takashima et al. ......... 524/495 |
| 6,489,385 B1 | * | 12/2002 | Fujii et al. ................... 524/186 |

FOREIGN PATENT DOCUMENTS

EP 1 148 097 10/2001

* cited by examiner

*Primary Examiner*—Robert D. Harlan
(74) *Attorney, Agent, or Firm*—Oblon, Spivak, McClelland, Maier & Neustadt, P.C.

(57) ABSTRACT

A thermoplastic elastomer composition having excellent heat aging characteristics, weather resistance, low-temperature physical properties, oil resistance and flexibility, and moldings using the same, such as hoses, are disclosed. The thermoplastic elastomer composition is obtained by dynamically heat treating a mixture containing (A) an olefin resin, (B) an unsaturated group-containing acrylic rubber, and (D) an inorganic filler in the presence of (E) a crosslinking agent, the component (B) comprising (B1) from 55 to 94.99% by weight of a structural unit derived from an acrylic acid alkyl ester monomer and/or an acrylic acid alkoxyalkyl ester monomer, (B2) from 0.01 to 20% by weight of a structural unit derived from a monomer having a carbon-carbon double bond in a side chain thereof, (B3) from 5 to 30% by weight of a structural unit derived from an unsaturated acrylonitrile monomer, and (B4) from 0 to 30% by weight of a structural unit derived from a monomer copolymerizable therewith, provided that the sum of (B1), (B2), (B3) and (B4) is 100% by weight.

20 Claims, No Drawings

OIL-RESISTANT THERMOPLASTIC ELASTOMER COMPOSITION AND MOLDINGS USING THE SAME

FIELD OF THE INVENTION

The present invention relates to a thermoplastic elastomer composition having excellent heat aging characteristics, weather resistance, low-temperature physical properties, oil resistance and flexibility, and to moldings using the same.

DESCRIPTION OF THE RELATED ART

Hoses comprising an inner tube, a reinforcing layer and an outer tube annularly laminated in this order are known. In those hoses, the inner tube and the outer tube are constituted of a rubber such as vulcanized rubbers and polyurethane, or a resin such as polyesters and nylons; the reinforcing layer is braided in a braid or spiral form with fibers such as nylons, polyesters, rayon, vinylon and aramid fibers; and the respective spaces between the layers are subjected to adhesion treatment with, for example, a rubber cement or a urethane-based adhesive. However, since production of so-called rubber hoses in which the inner and outer tubes are made of a rubber requires a vulcanization step, the production steps thereof become complicated so that the production cost is inevitably high. Further, so-called resin hoses in which the inner and outer tubes are merely made of a thermoplastic resin involve problems such that the hose is hard and poor in flexibility so that when it is bent, kink phenomenon occurs. In order to overcome those problems, a hose using a thermoplastic elastomer composition in which a vulcanized rubber phase, at least a part of which is crosslinked, is dispersed in a thermoplastic resin such as olefin thermoplastic resins, vinyl chloride-based thermoplastic resins, aramid-based thermoplastic resins and ester-based thermoplastic resins is proposed as disclosed in, for example, JP 6-64102A. However, considering from the standpoint of oil-resistant hoses, since general olefin thermoplastic elastomer compositions comprise polypropylene and an ethylene-propylene-based rubber and do not contain a polar group in the molecular structures thereof, they have a disadvantage to be poor in oil resistance. On the other hand, in order to improve the oil resistance, a thermoplastic elastomer comprising polypropylene and an acrylonitrile-butadiene-based rubber, and a thermoplastic elastomer comprising an ethylene-acrylic acid ester copolymer rubber and a polyolefin are proposed. However, although the former has excellent oil resistance, it contains a double bond in the molecular structure thereof. This involves the problem that the composition is poor in heat resistance and weather resistance. Further, although the latter has excellent heat resistance and weather resistance, it contains an ethylene moiety in the molecular structure thereof. This involves the problem that the composition is still poor in oil resistance, and particularly, the composition cannot substantially be used for fuel oils. A three-components blend comprising polypropylene, an acrylonitrile-butadiene-based rubber and an ethylene-acrylic acid ester rubber is proposed as a compromise of those compositions. However, this three-components blend was insufficient in a balance between heat resistance and oil resistance.

SUMMARY OF THE INVENTION

Accordingly, one object of the present invention is to provide a thermoplastic elastomer composition having excellent heat aging characteristics, weather resistance, low-temperature physical properties, oil resistance and flexibility.

Another object of the present invention is to provide moldings using the composition.

As a result of extensive and intensive investigations to achieve the above objects, it has been found that a thermoplastic elastomer composition having excellent heat aging characteristics, weather resistance, low-temperature physical properties, oil resistance and flexibility can be obtained by dynamically heat treating a mixture comprising (A) an olefin resin, (B) a specific acrylic rubber and (D) an inorganic filler in the presence of (E) a crosslinking agent. The present invention has been completed based on this finding.

The present invention provides a thermoplastic elastomer composition obtained by dynamically heat treating a mixture comprising (A) an olefin resin, (B) an unsaturated group-containing acrylic rubber and (D) an inorganic filler in the presence of (E) a crosslinking agent, wherein the component (B) comprises:

(B1) from 55 to 94.99% by weight of a structural unit derived from an acrylic acid alkyl ester monomer and/or an acrylic acid alkoxyalkyl ester monomer, (B2) from 0.01 to 20% by weight of a structural unit derived from a monomer having a carbon-carbon double bond in a side chain thereof, (B3) from 5 to 30% by weight of a structural unit derived from an unsaturated acrylonitrile monomer, and (B4) from 0 to 30% by weight of a structural unit derived from a monomer copolymerizable with (B1), (B2) and (B3), provided that the sum of (B1), (B2), (B3) and (B4) is 100% by weight.

The present invention further provides moldings using the above thermoplastic elastomer composition.

The moldings are preferably a hose.

DETAILED DESCRIPTION OF THE INVENTION

The present invention is described in detail below.

The thermoplastic elastomer composition according to the present invention is a thermoplastic elastomer composition obtained by dynamically heat treating a mixture comprising (A) an olefin resin, (B) an unsaturated group-containing acrylic rubber and (D) an inorganic filler in the presence of (E) a crosslinking agent, the component (B) comprising (B1) from 55 to 94.99% by weight of a structural unit derived from an acrylic acid alkyl ester monomer and/or an acrylic acid alkoxyalkyl ester monomer, (B2) from 0.01 to 20% by weight of a structural unit derived from a monomer having a carbon-carbon double bond in a side chain thereof, (B3) from 5 to 30% by weight of a structural unit derived from an unsaturated acrylonitrile monomer, and (B4) from 0 to 30% by weight of a structural unit derived from a monomer copolymerizable with (B1), (B2) and (B3), provided that the sum of (B1), (B2), (B3) and (B4) is 100% by weight.

Each of the structural elements is specifically described below.

(A) Olefin Resin

The olefin resin (A) (hereinafter referred to as "component (A)") used in the present invention is homopolymers or copolymers of an α-olefin having from 2 to 20 carbon atoms.

Specific examples of the olefin resin include the following (co)polymers: (1) ethylene homopolymers (that can be produced by any of a low-pressure process and a high-pressure process); (2) copolymers of ethylene with 10 mole % or less of other α-olefin or a vinyl monomer such as vinyl acetate and ethyl acrylate; (3) propylene homopolymers; (4) random copolymers of propylene with 20 mole % or less of other α-olefin; (5) block copolymers of propylene with 30 mole % or less of other α-olefin; (6) 1-butene homopolymers; (7) random copolymers of 1-butene with 10 mole % or less of other α-olefin; (8) 4-methyl-1-pentene homopolymers; and (9) random copolymers of 4-methyl-1-pentene with 20 mole % or less of α-olefin. Specific examples of the α-olefin include ethylene, propylene, 1-butene, 4-methyl-1-pentene, 1-hexene and 1-octene. Of those olefin resins, propylene homopolymers and random copolymers of propylene with 20 mole % or less of other α-olefin are particularly preferable. Those olefin resins can be used alone or as mixtures of two or more thereof.

In the case where the olefin resin used is a crystalline olefin resin, the resin has a crystallinity as measured by the X-ray process of generally 50% or more, preferably 55% or more. The resin has a density of 0.89 g/cm$^3$ or more, preferably from 0.90 to 0.94 g/cm$^3$.

The crystalline olefin resin has a maximum peak temperature as measured by a differential scanning calorimetry, i.e., a melting point (hereinafter referred to as "Tm" for simplicity), of preferably 100° C. or higher, more preferably 120° C. or higher. When Tm is lower than 100° C., there is a tendency that heat resistance and strength are not sufficiently exhibited.

In addition, the crystalline olefin resin has a melt flow rate (at a temperature of 230° C. under a load of 2.16 kg) (the melt flow rate being hereinafter referred to as "MFR" for simplicity) of preferably from 0.1 to 100 g/10 min., more preferably from 0.5 to 80 g/10 min. When MFR is less than 0.1 g/10 min., kneading processability and extrusion processability of the elastomer composition tend to become insufficient. On the other hand, when MFR exceeds 100 g/10 min., the strength tends to decrease.

Accordingly, the olefin resin used in the present invention is particularly preferably polypropylene and/or a copolymer of propylene and ethylene, each having a crystallinity of 50% or more, a density of 0.89 g/cm$^3$ or more, an ethylene unit content of 20 mole % or less, a Tm of 140 to 170° C., and an MFR of from 0.1 to 100 g/10 min.

In addition to the crystalline olefin resins, amorphous olefin resins can be used as the olefin resin.

Examples of the amorphous olefin resin include homopolymers such as atactic polypropylene and atactic poly-1-butene; copolymers of propylene (its content is 50 mole % or more) with other α-olefin (such as ethylene, 1-butene, 1-pentene, 1-hexene, 4-methyl-1-pentene, 1-octene and 1-decene); and copolymers of 1-butene (its content is 50 mole % or more) with other α-olefin (such as ethylene, propylene, 1-pentene, 1-hexene, 4-methyl-1-pentene, 1-octene and 1-decene).

The amorphous olefin resin has a melt viscosity at 190° C. of 50,000 cSt or less, preferably from 100 to 30,000 cSt, and more preferably from 200 to 20,000 cSt. Further, the amorphous olefin resin has a crystallinity as measured by the X-ray diffraction of less than 50%, preferably 30% or less, and more preferably 20% or less. The amorphous olefin resin has a density of preferably from 0.85 to 0.89 g/cm$^3$, and more preferably from 0.85 to 0.88 g/cm$^3$. The amorphous olefin resin has a number average molecular weight, Mn as reduced to polystyrene by GPC process, of preferably from 1,000 to 20,000, more preferably from 1,500 to 15,000.

The amorphous olefin resin is generally used in combination with the crystalline olefin resin, but only either one of them may be used.

A proportion of the component (A) in the thermoplastic elastomer composition is preferably from 10 to 70% by weight, more preferably from 10 to 50% by weight, and most preferably from 15 to 30% by weight, based on the weight of the sum of the components (A) and (B). Where the proportion of the component (A) is less than 10% by weight, a phase structure (morphology) of the ultimately obtained thermoplastic elastomer composition does not become a good sea-island structure (wherein the olefin resin is a sea (matrix), and the crosslinked rubber is an island (domain)), which is the characteristic of dynamic crosslinking type thermoplastic elastomers, whereby the molding processability and mechanical properties may possibly deteriorate. On the other hand, where the proportion exceeds 70% by weight, the flexibility and rubber elasticity of the ultimately obtained thermoplastic elastomer composition are lowered, which is not preferable.

(B) Unsaturated Group-Containing Acrylic Rubber

The unsaturated group-containing acrylic rubber (B) used in the present invention (hereinafter referred to as "component (B)") comprises (B1) from 55 to 94.99% by weight of a structural unit derived from an acrylic acid alkyl ester monomer and/or an acrylic acid alkoxyalkyl ester monomer (hereinafter referred to as "component (B1)"), (B2) from 0.01 to 20% by weight of a structural unit derived from a monomer having a carbon-carbon double bond in a side chain thereof (hereinafter referred to as "component (B2)"), (B3) from 5 to 30% by weight of a structural unit derived from an unsaturated acrylonitrile monomer (hereinafter referred to as "component (B3)"), and (B4) from 0 to 30% by weight of a structural unit derived from a monomer copolymerizable therewith (hereinafter referred to as "component (B4)"), provided that the sum of (B1), (B2), (B3) and (B4) is 100% by weight. The component (B) is prepared by copolymerizing the monomer mixture in the presence of a radical polymerization initiator.

Examples of the acrylic acid alkyl ester that forms the component (B1) after the copolymerization include methyl acrylate, ethyl acrylate, n-propyl acrylate, isopropyl acrylate, n-butyl acrylate, isobutyl acrylate, pentyl acrylate, hexyl acrylate, heptyl acrylate, 2-ethylhexyl acrylate, octyl acrylate, nonyl acrylate and decyl acrylate. Those acrylic acid alkyl esters may be used alone or as mixtures of two or more thereof. Of those, ethyl acrylate and n-butyl acrylate are particularly preferable.

Examples of the acrylic acid alkoxyalkyl ester that forms the component (B1) after the copolymerization include methoxymethyl acrylate, methoxyethyl acrylate, methoxypropyl acrylate, ethoxymethyl acrylate, ethoxyethyl acrylate, ethoxypropyl acrylate and butoxyethyl acrylate. Those acrylic acid alkoxyalkyl esters may be used alone or as mixtures of two or more thereof. Of those, methoxymethyl acrylate, methoxyethyl acrylate, ethoxymethyl acrylate and etoxyethyl acrylate are particularly preferable.

A structural proportion of the component (B1) in the component (B) (a copolymerization proportion in the component (B)) is from 55 to 94.99% by weight, and preferably from 60 to 94.99% by weight. Where this proportion is less than 55% by weight, the desired heat resistance is not obtained in the thermoplastic elastomer composition obtained. On the other hand, where the proportion exceeds 94.99% by weight, the oil resistance becomes poor.

The monomer having a carbon-carbon double bond in a side chain thereof that forms the component (B2) is a monomer for introducing a crosslinking point in the component (B). Examples of the monomer include dihydrodicyclopentenyl acrylate, dihydrodicyclopentenyl methacrylate, dihydrodicyclopentenyl itaconate, dihydrodicyclopentenyl maleate, dihydrodicyclopentenyl fumarate, dihydrodicyclopentenyloxyethyl acrylate (DCPEA), dihydrodicyclopentenyloxyethyl methacrylate, dihydrodicyclopentenyloxyethyl itaconate, dihydrodicyclopentenyloxyethyl maleate, dihydrodicyclopentenyloxyethyl fumarate, vinyl methacrylate (CAS RN 4245-37-8), vinyl acrylate (CAS RN 2177-18-6), 1,1-dimethylpropenyl methacrylate, 1,1-dimethylpropenyl acrylate, 3,3-dimethylbutenyl methacrylate, 3,3-dimethylbutenyl acrylate, divinyl itaconate, divinyl maleate, divinyl fumarate, dicyclopentadiene, methyldicyclopentadiene, ethylidene norbornene, 1,1-dimethylpropenyl methacrylate, 1,1-dimethylpropenyl acrylate, 3,3-dimethylbutenyl methacrylate, 3,3-dimethylbutenyl acrylate, vinyl 1,1-dimethylpropenyl ether, vinyl 3,3-dimethylbutenyl ether, 1-acryloyloxy-1-phenylethene, 1-acryloyloxy-2-phenylethene, 1-methacryloyloxy- 1-phenylethene and 1-methacryloyloxy-2-phenylethene. Those monomers can be used alone or as mixtures of two or more thereof. Of those, dihydrodicyclopentenyl acrylate, dihydrodicyclopentenyl methacrylate, dihydrodicyclopentenyloxyethyl acrylate, dihydrodicyclopentenyloxyethyl methacrylate, vinyl methacrylate and vinyl acrylate are particularly preferable.

A structural proportion of the component (B2) in the component (B) (a copolymerization proportion in the component (B)) is from 0.01 to 20% by weight, and preferably from 0.02 to 8% by weight. Where this proportion is less than 0.01% by weight, the degree of crosslinking becomes insufficient so that the tensile strength becomes excessively low, in the obtained thermoplastic elastomer composition, whereby a composition having a suitable mechanical strength is not obtained. On the other hand, where the proportion exceeds 20% by weight, the hardness becomes excessively high in the thermoplastic elastomer composition obtained, and such is not preferred.

Examples of the unsaturated nitrile that forms the component (B3) after the copolymerization include acrylonitrile, methacrylonitrile, ethacrylonitrile, α-chloroacrylonitrile and α-fluoroacrylonitrile. Those unsaturated nitrites can be used alone or as mixtures of two or more thereof. Of those, acrylonitrile is particularly preferable. A proportion of the component (B3) used in the component (B) (a copolymerization proportion in the component (B)) is from 5 to 30% by weight, and preferably from 10 to 30% by weight. Where this proportion is less than 5% by weight, the oil resistance of the obtained thermoplastic elastomer composition becomes insufficient, whereas where it exceeds 30% by weight, the hardness of the obtained thermoplastic elastomer composition becomes high, and therefore, such is not preferred.

The other monomer that forms the component (B4) after the copolymerization are not particularly limited so long as they are copolymerizable with the monomers that form the components (B1), (B2) and (B3), respectively. Examples of the other monomer include monofuncional methacrylates such as methyl methacrylate, benzyl methacrylate, phenyl methacrylate, 1-methylcyclohexyl methacrylate, cyclohexyl methacrylate, chlorobenzyl methacrylate, 1-phenylethyl methacrylate, 1,2-diphenylethyl methacrylate, diphneyl methacrylate, furfuryl methacrylate, 1-phenylcyclohexyl methacrylate, pentachlrophenyl methacrylate and pentabromophenyl methacrylate; styrene, vinyltoluene, vinylpyridine, α-methylstyrene, vinylnaphthalene, halogenated styrenes, acrylamide, methacrylamide, N-methylolacrylamide, vinyl acetate, vinyl chloride, vinylidene chloride, (meth)acrylic acid esters of alicyclic alcohols (such as cyclohexyl acrylate) and (meth)acrylic acid esters of aromatic alcohols (such as benzyl acrylate). By adding the monofunctional methacrylate, there is no blocking of crumbs obtained after copolymerization of the component (B), and handling becomes ease. Further examples of the monomer include polyfunctional unsaturated monomers such as ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, pentaerythritol tri(meth)acrylate, pentaerythritol tetra(meth)acrylate, divinylbenzene, diisopropenylbenzene, trivinylbenzene, and hexamethylene di(meth)acrylate. Those copolymerized with the polyfunctional unsaturated monomer become a partially crosslinked rubber, so that the surface of a molding is improved and the amounts of a crosslinking agent and a crosslinking aid to be added during the dynamic crosslinking can be decreased, leading to an effective decrease in the production cost. The component (B4) is preferably methyl methacrylate, benzyl methacrylate and phenyl methacrylate. Of those, methyl methacrylate is particularly preferable.

A structural proportion of the component (B4) in the component (B) is from 0 to 30% by weight, preferably from 0 to 20% by weight.

The radical polymerization initiator that is used in copolymerizing the monomer mixture is not particularly limited. Examples of the initiator include peroxides such as potassium persulfate, p-menthane hydroperoxide and methyl isobutyl ketone peroxide, and azo compounds such as azobisisobutyronitrile. An amount of the radical polymerization initiator used is from 0.001 to 1.0 part by weight per 100 parts by weight of the monomer mixture.

Copolymerization reaction for obtaining the component (B) can be conducted by the conventional polymerization process such as a suspension polymerization process, an emulsion polymerization process and a solution polymerization process. An emulsifier that can be used in the emulsion polymerization process can be any substances capable of emulsifying and dispersing the monomer mixture. Examples of the emulsifier that can be used include alkyl sulfates, alkylaryl sulfonates and higher fatty acid salts. In the copolymerization reaction, reaction temperature is from 0 to 80° C., and reaction time is from about 0.01 to 30 hours.

The thus obtained component (B) preferably has a Mooney viscosity [$ML_{1+4}$ (100 ° C.)] of from 10 to 150.

A proportion of the component (B) in the thermoplastic elastomer composition is preferably from 90 to 30% by weight, more preferably from 90 to 50% by weight, and most preferably from 85 to 70% by weight, based on the weight of the sum of the components (A) and (B). Where the proportion of the unsaturated group-containing acrylic rubber (B) is less than 30% by weight, the oil resistance of the ultimately obtained thermoplastic elastomer composition tends to deteriorate. On the other hand, where the proportion exceeds 90% by weight, a phase structure (morphology) of the ultimately obtained thermoplastic elastomer composition does not become a good sea-island structure (wherein the olefin resin is a sea (matrix), and the crosslinked rubber is an island (domain)), which is the characteristic of dynamic crosslinking type thermoplastic elastomers, whereby the molding processability and mechanical properties tend to deteriorate.

(C) Compatibilizing Agent

In the thermoplastic elastomer composition according to the present invention, the olefin resin (A) and the unsaturated group-containing acrylic rubber (B) are originally a sparingly compatible system or a non-compatible system with each other. Therefore, it is preferable to compound a compatibilizing agent having a structure similar to those of the both components. The compatibilizing agent (C) used in the present invention (hereinafter referred to as "component (C)") is polymers having a solubility parameter (SP value) in the middle between the olefin resin (A) (SP value: from 7 to 8) and the unsaturated group-containing acrylic rubber (B) (SP value: from 9 to 10), specifically polymers having a solubility parameter (SP value) in the range of from 7.2 to 9.5. The SP value as referred to herein is a value calculated by the HOY's method as described on page 339 of *Polymer Handbook*, Second Edition, edited by BRANDRUP. Examples of the polymer having the SP value within the above defined range include ethylene-acrylic acid ester copolymers, functional group-containing polyolefins, polyolefin glycol (meth)acrylates, low nitrile-containing acrylonitrile-butadiene rubbers or hydrogenation products thereof, styrene-butadiene block copolymers or hydrogenation products thereof, styrene-isopropylene block copolymers or hydrogenation products thereof, styrene-butadiene rubbers, butadiene rubbers, isoprene rubbers, epichlorohydrin rubbers, chloroprene rubbers, ethylene chloride-α-olefin copolymers, ethylene-vinyl ester copolymers and chlorosulfonated polyethylenes. Of those, at least one member selected from the group consisting of ethylene-acrylic acid ester copolymers, functional group-containing polyolefins and polyolefin glycol (meth)acrylates is preferably used.

The ethylene-acrylic acid ester copolymers comprises ethylene as an essential component and at least one monomer selected from alkyl acrylates having an alkyl group having from 1 to 8 carbon atoms and alkoxyalkyl acrylates having an alkoxy group having from 1 to 4 carbon atoms and an alkylene group having from 1 to 4 carbon atoms. The ethylene-acrylic acid ester copolymers can further include copolymers of ethylene, the above-described monomers and vinyl acetate, and ethylene, the above-described monomers, vinyl acetate, and a monomer containing a carboxyl group as a crosslinking point and/or a monomer containing an epoxy group as a crosslinking point.

Specific examples of the copolymer include copolymers of ethylene with a carboxyl group-containing monomer, such as an ethylene-methyl acrylate copolymer, an ethylene-methyl acrylate-acrylic acid copolymer and an ethylene-methyl acrylate-methacrylic acid copolymer; copolymers of ethylene with an epoxy group-containing monomer, such as an ethylene-methyl acrylate-glycidyl methacrylate copolymer, an ethylene-methyl acrylate-glycidyl acrylate copolymer and an ethylene-methyl acrylate-ally glycidyl ether copolymer; and copolymers of ethylene with an epoxy group-containing monomer, such as an ethylene-alkyl acrylate-vinyl acetate copolymer, an ethylene-alkyl acrylate-vinyl acetate-glycidyl methacrylate copolymer, an ethylene-alkyl acrylate-vinyl acetate-glycidyl acrylate copolymer and an ethylene-alkyl acrylate-vinyl acetate-allyl glycidyl ether copolymer. It is desired that the copolymer has a number average molecular weight of from 3,000 to 500,000. It is more preferable that the copolymer has a Mooney viscosity [$ML_{1+4}$ (100° C.)] of from 10 to 150. Those ethylene-acrylic acid ester copolymers can be used alone or as mixtures of two or more thereof.

The functional group-containing polyolefin means a polymer obtained by modifying a polyolefin resin or polyolefin rubber with a functional group. The polyolefin resin or polyolefin rubber is a resin or rubber prepared by polymerizing mainly an α-olefin. Examples of the α-olefin include ethylene, propylene, 1-butene, 4-methyl-1-butene, 4-methyl-1-pentene. Of those, ethylene and propylene are preferable. Those α-olefin can be used alone or as mixtures of two or more thereof. Examples of the polyolefin-based rubber include an ethylene-propylene rubber and an ethylene-propylene-diene rubber. The functional group is preferably at least one functional group selected from the group consisting of an epoxy group, a carboxyl group, an acid anhydride, and a hydroxyl group. Examples of the functional group-containing polyolefin include those graft-modified with, for example, an unsaturated epoxide such as glycidyl methacrylate, glycidyl acrylate, vinyl glycidyl ether or allyl glycidyl ether. Specific examples of the functional group-containing compound used for modification include maleic acid, fumaric acid, itaconic acid, citraconic acid, allylsuccinic acid, maleic anhydride, fumaric anhydride and itaconic anhydride, and maleic anhydride is preferable. Examples of the modification method include a method in which the polyolefin resin or polyolefin rubber is grafted with the functional group-containing compound in an alkyl aromatic hydrocarbon solvent at a temperature of 115° C. or higher using a radical initiator; and a method in which a very small amount of an alkyl peroxide, preferably an aliphatic bifunctional peroxide, the functional group-containing compound, and the polyolefin resin and/or polyolefin rubber are kneaded with each other at a temperature of 200° C. or higher. Specific examples of the functional group-containing polyolefin include maleic anhydride-modified LDPE (low-density polyethylene), maleic anhydride-modified HDPE (high-density polyethylene), maleic anhdyride-modified LLDPE (linear low-density polyethylene), maleic anhydride-modified EVA (ethylene-vinyl acetate copolymer), and maleic anhydride-modified PP (polypropylene). Of those, maleic anhydride-modified LLDPE is preferable.

Examples of the polyolefin glycol (meth)acrylate include polypropylene glycol mono(meth)acrylate, polyethylene glycol mono(meth)acrylate, polyethylene glycol propylene glycol mono(meth)acrylate, methoxypolyethylene glycol mono(meth)acrylate, ethoxypolyethylene glycol mono (meth)acrylate, methoxypolypropylene glycol mono(meth) acrylate, and ethoxypolypropylene glycol mono(meth) acrylate. Those polyolefin-glycol (meth)acrylates can be used alone or as mixtures of two or more thereof. The polyolefin glycol has a degree of polymerization of from 2 to 10.

The amount of the component (C) is from 0.5/99.5 to 20/80, preferably from 1/99 to 10/90, and more preferably from 2/98 to 7.5/92.5, in terms of a weight ratio of the component (C) to the component (B) ((C)/(B)).

(D) Inorganic Filler

The inorganic filler (D) used in the present invention (hereinafter referred to as "component (D)") can generally use inorganic fillers for a rubber composition. Examples of the inorganic filler (D) include silica, ground whiting, chalk, light calcium carbonate, extra-fine activated calcium carbonate, special calcium carbonate; basic magnesium carbonate, kaolin, calcined clay, pyrophyllite clay, silane-processed clay, synthetic calcium silicate, synthetic magnesium silicate, synthetic aluminum silicate, magnesium carbonate, aluminum hydroxide, magnesium hydroxide, magnesium oxide, kaolin, sericite, talc, finely divided talc, wollastonite, zeolite, bentonite, mica, asbestos, PMF (Processed Mineral Fiber), sepiolite, potassium titanate, ellestadite, stain spar, glass balloon, silica balloon, hydrotalcite, fly ash balloon, Shirasu balloon, carbon-based balloon, alumina, barium sulfate, aluminum sulfate, potassium sulfate and molybdenum disulfide. Those inorganic fillers can be used alone or as mixtures of two or more thereof. Of those, silica is particularly preferable from the standpoint of high oil absorption properties.

The amount of the component (D) added is from 0.1 to 50 parts by weight, preferably from 0.5 to 30 parts by weight, more preferably 1 to 20 parts by weight, per 100 parts by weight of the sum of the components (A) and (B). Where the amount of the component (D) is less than 0.1 part by weight, the component (B) is liable to adhere to rotor, casing or the like of a mixer due to decrease in viscosity of the component (B) at high temperature. Further, where a plasticizer, a softening agent or the like is added, oil absorption of the resulting composition is insufficient, and sticking in kneading/processing becomes vigorous. On the other hand, where the proportion exceeds 50 parts by weight, viscosity increases excessively, or compression set that is the measure of flexibility of the thermoplastic elastomer composition obtained increases, which is not preferable.

In the case where silica is used, a silane coupling agent is generally used for the surface treatment of silica. The silane coupling agent is not particularly limited. Examples of the silane coupling agent include vinyl trimethoxysilane, vinyl triethoxysilane, vinyl tris(β-methoxyethoxy)silane, vinyl trichlorosilane, vinyl triacetoxysilane, N-(β-aminoethyl)-γ-aminopropyl trimethoxysilane, γ-aminopropyl trimethoxysilane,γ-aminopropyl triethoxysilane, γ-glycidoxypropyl trimethoxysilane, γ-glycidoxypropylmethyl dimethoxysilane, β-(3,4-epoxycyclohexyl)ethyl trimethoxysilane, γ-methacryloxypropyl trimethoxysilane, γ-methacryloxypropyl tris(β-methoxyethoxy)silane, γ-mercaptopropyl trimethoxysilane, methyl trimethoxysilane, methyl triethoxysilane, hexamethyl disilazane, γ-anilinopropyl trimethoxysilane and N-[β-(N-vinylbenzalamino)ethyl]-γ-aminopropyl trimethoxysilane hydrochloride. Those silane coupling agents can be used alone or as mixtures of two or more thereof.

An amount of the silane coupling agent compounded is usually from 0.1 to 10 parts by weight, and preferably from 0.5 to 5 parts by weight, per 100 parts by weight of the sum of the components (A) and (B). Where the amount of the silane coupling agent is less than 0.1 parts by weight, the tensile characteristic and compression set of the thermoplastic elastomer composition obtained may be insufficient, whereas where it exceeds 10 parts by weight, the dry physical properties of the crosslinked rubber are decreased, whereby the rubber elasticity may deteriorate.

The silica filler has a pH falling within the range of from 2 to 10, preferably from 3 to 8, and particularly preferably from 4 to 6. Where the pH of the silica filler is lower than pH 2, the crosslinking rate becomes slow, whereas where it exceeds pH 10, scorch likely generates. The silica filler has an oil absorption of from 150 to 300 cc/100 g, and preferably from 200 to 300 cc/100 g. Where the oil absorption of the silica filler is less than 150 cc/100 g, the viscosity during mixing the components (B) and (F) in the production step of the thermoplastic elastomer composition according to the present invention is low so that sticking becomes vigorous, leading a problem in the practical use. On the other hand, where the oil absorption exceeds 300 cc/100 g, the viscosity becomes excessively high, and therefore, such is not preferred.

(E) Crosslinking Agent

The crosslinking agent (E) used in the present invention (hereinafter referred to as "component (E)") is a compound capable of crosslinking at least one unsaturated group-containing acrylic rubber in the composition by dynamic heat treating at a temperature of the melting point or higher of the olefin resin. Any crosslinking agents can be used without particular limitations so long as they can crosslink a polymeric compound having a double bond in the molecule thereof. Examples of the crosslinking agent include sulfur, organic sulfur-containing compounds, organic peroxides, resins, quinone derivatives, polyhalides, bis (dioxotriazoline) derivatives, aldehydes, epoxy compounds, amine-borane complexes and bipolar compounds. Further example of the crosslinking agent is methyl hydrogensiloxane which is used in, for example, hydrosilylation in the presence of a platinum catalyst (platinum crosslinking). Of those crosslinking agents, sulfur, organic sulfur-containing compounds, organic peroxides and platinum crosslinking are preferable, and the organic peroxides are more preferable. Those crosslinking agents can be used alone or as mixtures of two or more thereof.

The amount of the crosslinking agent used is from 0.1 to 20 parts by weight, preferably from 1 to 10 parts by weight, per 100 parts by weight of the component (B).

The organic peroxides are preferable those having a decomposition temperature for obtaining a one-minute half-life (the half-life is one minute) of 150° C. or higher. Examples of the organic peroxide include 1,1-bis(t-butylperoxy)cyclohexane, 2,2-bis(4,4-di-t-butylperoxycyclohexyl)propane, 1,1-bis(t-butylperoxy) cyclododecane, t-hexylperoxyisopropyl monocarbonate, t-butylperoxy maleic acid, t-butylperoxy-3,5,5-trimethylhexanoate, t-butylperoxy laurate, 2,5-dimethyl-2, 5-di(m-toluoyl peroxy)hexane, t-butyl peroxy isopropyl monocarbonate, t-butylperoxy 2-ethylhexyl monocarbonate, t-hexylperoxy benzoate, 2,5-dimethyl-2,5-di (benzoylperoxy)hexane, t-butylperoxy acetate, 2,2-bis(t-butylperoxy)butane, t-butylperoxy benzoate, n-butyl-4,4-bis (t-butylperoxy)valerate, di-t-butylperoxy isophthalate, α,α'-bis(t-butylperoxy)diisopropylbenzene, dicumyl peroxide, 2,5-dimethyl-2,5-di(t-butylperoxy)hexane, t-butyl cumyl peroxide, di-t-butyl peroxide, p-menthane hydroperoxide, 2,5-dimethyl-2,5-di(t-butylperoxy)hexine-3, diisopropylbenzene hydroperoxide, t-butyl trimethylsilyl peroxide, 1,1, 3,3-tetramethylbutyl hydroperoxide, cumene hydroperoxide, t-hexyl hydroperoxide and t-butyl hydroperoxide. An amount of the organic peroxide added is from 0.3 to 15 parts by weight, preferably from 0.5 to 10 parts by weight, per 100 parts by weight of the component (B). Where the amount of the organic peroxide added is less than 0.3 parts by weight, not only the crosslinking time becomes very long, but also the crosslinking tends to become insufficient. On the other hand, where the amount exceeds 15 parts by weight, the crosslinked material tends to become hard and brittle.

The organic peroxides can be used alone or as mixtures of two or more thereof. In the present invention, when the organic peroxide is used in combination with a crosslinking aid, a uniform and mild crosslinking reaction can be conducted. Examples of the crosslinking aid include sulfur or sulfur compounds such as powdered sulfur, colloidal sulfur, precipitated sulfur, insoluble sulfur, surface-treated sulfur and dipentamethylene thiuram tetrasulfide; oxime compounds such as p-quinone oxime and p,p'-dibenzoylquinone oxime; and polyfunctional monomers such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, trimethylolpropane tri(meth)acrylate, diallyl phthalate, tetraallyloxyethane, triallyl cyanurate, N,N'-m-phenylene bismaleimide, N,N'-toluylene bismaleimide, maleic anhydride, divinylbenzene and zinc di(meth)acrylate. Of those crosslinking aids, p,p'-dibenzoylquinone oxime, N,N'-m-phenylene bismaleimide and divinylbenzene are preferable. N,N'-m-phenylene bismaleimide can act as the crosslinking agent with the use alone. Those crosslinking aids can be used alone or as mixtures of two or more thereof. An amount of the crosslinking aid used is from 0 to 20 parts by weight, and preferably from 1 to 10 parts by weight, per 100 parts by weight of the component (B).

In the case where sulfur is used as the crosslinking agent, thiazoles such as mercapto benzothiazole, thiurams such as tetramethylthiuram disulfide, guanidines such as diphenyl guanidine, and dithiocarbamic acid salts such as zinc dimethyldithiocarbamate can effectively be used as the crosslinking aid.

In the case where the organic sulfur-containing sulfur compound is used as the crosslinking agent, thiuram-based promoters such as tetramethylthiuram disulfide and 4,4'-dithiomorpholine can effectively be used.

An amount of such a crosslinking agent is usually from 0.1 to 20 parts by weight, and preferably from 1 to 10 parts by weight, per 100 parts by weight of the component (B).

(F) Plasticizer

The thermoplastic elastomer composition according to the present invention can optionally contain (F) a plasticizer, in addition to the above-described components (A) and (B). The plasticizer (F) that can be used (hereinafter referred to as "component (F)") can use conventional plasticizers for a rubber composition, but plasticizers having excellent heat resistance are preferably used. Examples of the plasticizer (F) include ether-based plasticizers, ether ester-based plasticizers, and trimellitic acid-based plasticizers, each having excellent heat resistance.

Examples of the ether-based plasticizer include aliphatic dicarboxylic acids condensed with an alkoxypolyoxyethylene alcohol. Specifically, for example, Adekacizer RS-705 made by Asahi Denka Co., Ltd. and Monocizer W-264 made by Dainippon Ink and Chemicals, Incorporated are included.

The ether ester-based plasticizer is not particularly limited with respect to the production method thereof, and is easily obtained by reacting 2-ethylhexylic acid with an ether glycol in a molar ratio of 2:1. For example, the ether ester-based plasticizer can be obtained by reacting a mixed ether glycol containing a predetermined amount of, for example, pentaethylene glycol, hexaethylene glycol or heptaethylene glycol, with 2-ethylhexylic acid in the conventional process. It can also be produced by mixing diesters obtained by reacting pentaethylene glycol, hexaethylene glycol or heptaethylene glycol individually with 2-ethylhexylic acid in the conventional process such that a mean degree of polymerization of polyethylene glycol is from 5 to 10. Specifically, for example, Adekacizer RS-107, RS-1000, RS-735, and RS-700, all of which are made by Asahi Denka Co., Ltd., are included in the examples of the ether ester-based plasticizer.

The trimellitic acid-based plasticizer includes trimellitic acid esters in which each of three carboxylic acids of trimellitic acid is condensed with an alcohol. Examples of the trimellitic acid-based plasticizer include trimethyl trimellitate, triethyl trimellitate, tripropyl trimellitate, tributyl trimellitate, triamyl trimellitate, trihexyl trimellitate, triheptyl trimellitate, tri-n-octyl trimellitate, tri-2-ethylhexyl trimellitate, trinonyl trimellitate, tris(decyl) trimellitate, tris(dodecyl) trimellitate, tris(tetradecyl) trimellitate, tris(mixed $C_8$–$C_{12}$ alkyl) trimellitate, tris(mixed $C_7$–$C_9$ alkyl) trimellitate, and trilauryl trimellitate. Specifically, for example, Adekacizer C-8, C-880, C-79, C810, C-9N, and C-10, all of which are made by Asahi Denka Co., Ltd., are included.

The plasticizer has a molecular weight of preferably from 400 to 1,000, and more preferably from 500 to 900. Where the molecular weight of the plasticizer is less than 400, the heat resistance is insufficient. On the other hand, where it exceeds 1,000, the low-temperature resistance and the compression set are poor, which is not preferable. Those plasticizers can be used alone or as mixtures of two or more thereof.

The plasticizer may be added to the components (A) and (B) during the production of the thermoplastic elastomer composition, or may be added previously to the component (B).

An amount of the plasticizer compounded is from 0 to 100 parts by weight, preferably from 5 to 70 parts by weight, and more preferably from 10 to 50 parts by weight, per 100 parts by weight of the sum of the components (A) and (B). Where the amount of the plasticizer compounded exceeds 100 parts by weight, there are tendencies that the plasticizer bleeds out from the ultimately obtained thermoplastic elastomer composition, and that the mechanical strength and the rubber elasticity are decreased.

(G) Extender oil

If desired and necessary, the thermoplastic elastomer composition according to the present invention can further contain (G) an extender oil. The extender oil used in the present invention (hereinafter referred to as "component (G)") can use extender oils generally used for a rubber composition. The extender oil used is preferably aromatic or naphthenic extender oils. Of those, extender oils having aroma carbon ($C_A$ %): 3 to 60, naphthene carbon ($C_N$ %) of 20 to 50 and paraffin carbon ($C_P$ %) of 0 to 60 (provided that $C_A+C_N+C_P=100$) according to ring analysis by n-d-M method as defined in ASTM D3238-95 (re-approved in 2000) are more preferable. Where $C_P$ exceeds 60%, mechanical strength of the thermoplastic elastomer composition according to the present invention and skin appearance of a molding thereof may be poor.

The amount of the component (G) compounded is from 0 to 50 parts by weight, preferably from 1 to 20 parts by weight, per 100 parts by weight of the sum of the components (A) and (B).

(H) Aromatic Oligomer

If desired and necessary, the thermoplastic elastomer composition according to the present invention can further contain (G) an aromatic oligomer. The aromatic oligomer used in the present invention (hereinafter referred to as "component (G)") can be any aromatic oliogmers so long as those have a weight average molecular weight of from about 200 to 10,000, and include resins comprising an aromatic skeleton. Examples of the aromatic oligomer include coumarone-indene resins, xylene resins, phenol-novolak resins, styrenated phenolic resins and naphthene resins. Of those, coumarone-indene resins and naphthene resins are preferable. Where the weight average molecular weight of the oligomer is less than 200, mechanical strength of the molding is insufficient, and on the other hand, if it exceeds 10,000, kneading properties deteriorate.

The amount of the component (G) compounded is from 0 to 20 parts by weight, preferably from 1 to 10 parts by weight, per 100 parts by weight of the sum of the components (A) and (B). If the amount exceeds 20 parts by weight, sticking becomes strong, so that kneading properties may deteriorate.

The thermoplastic elastomer composition according to the present invention can further contain various additives within the range in which the performance of the thermoplastic elastomer composition is not impaired. Examples of the additives include a lubricant, a metal oxide, a reinforcing agent, a softener other than the component (G), and an antioxidant.

Examples of the lubricant include stearic acid, oleic acid, lauric acid, dibutylammonium oleate, zinc stearate, calcium stearate, potassium stearate, sodium stearate and stearylamine. Those lubricants can be used alone or as mixtures of two or more thereof.

Examples of the metal oxide include zinc white, activated zinc white, surface-processed zinc white, zinc carbonate, composite zinc white, composite activated zinc white, surface-processed magnesium oxide, magnesium oxide, calcium hydroxide, extra-fine calcium hydroxide, lead monoxide, red lead and white lead. Those metal oxides can be used alone or as mixtures of two or more thereof.

Examples of the softener include petroleum-based softeners other than the component (G), vegetable oil-based softeners, and factices. Examples of the vegetable oil-based softener include castor oil, cotton seed oil, linseed oil, rapeseed oil, soy bean oil, palm oil, coconut oil, peanut oil and Japan tallow. Examples of the factice include brown factice, white factice and semitransparent factice.

Examples of the antioxidant include naphthylamine-based antioxidants, diphenylamine-based antioxidants, p-phenylenediamine-based antioxidants,, quinoline-based antioxidants, hydroquinone derivative-based antioxidants, mono-, bis-, tris- or polyphenol-based antioxidants, thiobisphenol-based antioxidants, hindered phenol-based antioxidants, phosphite-based antioxidants, imidazole-based antioxidants, dithiocarbamic acid nickel salt-based antioxidants and phosphoric acid-based antioxidants. Those antioxidants can be used alone or as mixtures of two or more thereof.

The reinforcing agent is, for example, carbon black, and examples thereof include SAF Carbon Black, ISAF Carbon Black, HAF Carbon Black, FEF Carbon Black, GPF Carbon Black, SRF Carbon Black, FT Carbon Black, MT Carbon Black, Acetylene Carbon Black and Ketjen Black. Those reinforcing agents can be used alone or as mixtures of two or more thereof.

Production of Thermoplastic Elastomer Composition:

The thermoplastic elastomer composition according to the present invention is a thermoplastic elastomer composition produced by dynamic crosslinking for proceeding with crosslinking of a rubber while kneading a thermoplastic resin with a rubber composition, i.e., dynamically proceeding with the crosslinking. By utilizing such a production process, the thermoplastic elastomer composition obtained becomes in a state that a crosslinked rubber phase, at least a part of which is a discontinuous phase, is finely dispersed in a thermoplastic resin phase, at least a part of which is a continuous phase. Accordingly, not only the thermoplastic elastomer composition obtained exhibits a behavior similar to that of the crosslinked rubber, but also at least the continuous phase is the thermoplastic resin phase. As a result, it is possible to apply a processing according to thermoplastic resins in molding processing.

In the production of the thermoplastic elastomer composition according to the present invention, there are no particular limitations on a machine used for kneading the components (A), (B), (D) and (E) and optionally, the components (C), (F), (G) and (H). A screw extruder, a kneader, a Banbury mixer, a twin-screw kneading extruder and the like can be used. Examples of the kneading processing include the following two methods.

(1) The components (B), (C), (D), (F), (G) and (H) are charged in a closed kneading machine (such as a kneader or a Banbury mixer) and kneaded under heating (at 150 to 160° C.), and the component (A) is then added. The mixture is melt kneaded and then molded into a pellet form by an extruder. The pellets are kneaded with the crosslinking agent (E) for dynamic crosslinking and optionally with the crosslinking aid by a twin-screw kneading extruder, thereby dynamically crosslinking the component (B) while heating and melting (at about 200° C.).

(2) The component (A) molded into a pellet form is charged from a first inlet of a twin-screw kneading extruder, and heated and melted while mixing by the twin screws. Using a kneader for rubber, such as a Banbury mixer, components (B), (C), (D), (F), (G) and (H) and optionally, a lubricant, a reinforcing agent, an antioxidant, etc., are kneaded with each other to prepare a master batch not containing a crosslinking system, which is then pelletized by a pelletizer for rubber. After heating and melting the component (A) by the twin-screw kneading extruder as described above, the pellets of the rubber component containing the previously pelletized components (B), (C), (D), (F), (G) and (H) are charged from a second inlet of the twin-screw kneading extruder, thereby dispersing the rubber component in the component (A). The crosslinking agent (E) and optionally, a crosslinking aid are charged from third and also fourth inlets of the twin-screw kneading extruder, thereby crosslinking (dynamically crosslinking) the component (B) under kneading. By carrying out the crosslinking in such ways, the crosslinking can be conducted in a state such that the component (B) is thoroughly dispersed in the component (A) and the component (B) is thoroughly fine. Thus, the thermoplastic elastomer composition is prepared in which the component (B) as a discontinuous phase (domain) is stably dispersed in the component (A) as a continuous phase (matrix). In such a thermoplastic elastomer composition, the crosslinked rubber composition as the discontinuous phase has a particle size of preferably 50 $\mu$m or smaller, and more preferably from 1 to 10 $\mu$m.

In addition, in the case where compounding additives, such as a reinforcing agent, a softener and an antioxidant, are added to the composition according to the present invention, the compounding additives may be added to the component (B) during kneading, but it is better that the compounding additives other than the crosslinking agent are previously mixed before the kneading. Further, the compounding additives to the component (A) may be previously mixed before the kneading, or may be added during the kneading.

The conditions of melt kneading of the components (A) and (B), or the components (A), (B) and (C) are as follows. Kneading temperature is, for example, from 150 to 250° C., and preferably from 150 to 200° C.; a shear rate during the kneading is from 500 to 7,000 per second, and preferably from 500 to 2,000 per second; overall time of the melt kneading is from 30 seconds to 10 minutes; and crosslinking time after the addition of the crosslinking agent is preferably from 15 seconds to 5 minutes.

The thus obtained thermoplastic elastomer composition according to the present invention has excellent heat resistance, oil resistance, low-temperature physical properties and flexibility. Although the thermoplastic elastomer composition according to the present invention is not particularly limited in its applications, the composition is suitably used in the case where oil resistance and/or the heat resistance are required. For example, the thermoplastic elastomer composition according to the present invention is suitably used for not only various hoses such as oil-resistant hoses for fuel oil or lubricant system, oil cooler hoses, air duct hoses, power steering hoses, control hoses, inter cooler hoses, torque converter hoses, oil return hoses, vacuum sensing hoses, and heat-resistant hoses, but also cushioning materials such as sealing materials (e.g., bearing seals, valve stem seals, various oil seals, O-rings, packings, gaskets), rubber isolators, and damping rubbers; as well as parts in the surroundings of automobile where the oil resistance and/or the heat resistance is required, such as belts, rolls, rubber sheets, various diaphragms, and oil level gauges.

The present invention is described in more detail by reference to the following Examples, but it should be understood that the invention is not construed as being limited thereto.

In the following Examples and Comparative Examples, all parts and percentages are by weight, unless otherwise indicated. Further, various measurements in the Examples and Comparative Examples were according to the following methods.

Preparation of Thermoplastic Elastomer Composition:

The following olefin resin, unsaturated group-containing acrylic rubbers, compatibilizing agents, inorganic filler, plasticizers, crosslinking agent and other additives were used.

(A) Olefin Resin

Polypropylene polymer "PP1": density: 0.90 g/cm$^3$, MFR (at a temperature of 230° C. under a load of 21 N): 3 g/10 min., trade name: "Novatec PP MA4", made by Japan Polychem Corporation (B) Unsaturated Group-containing Acrylic Rubber An unsaturated group-containing acrylic rubber was synthesized by the following methods.

SYNTHESIS EXAMPLE 1

200 parts of ion-exchanged water were introduced into a nitrogen-purged autoclave, and 100 parts of a monomer mixture consisting of 83.5 parts of ethyl acrylate (EA), 12.5 parts of acrylonitrile (AN) and 4 parts of dihydrodicyclopentenyloxyethyl acrylate (DCPEA), 4 parts of sodium laurate, 0.25 parts of p-menthane hydroperoxide, 0.01 parts of ferrous sulfate, 0.025 parts of sodium ethylenediaminetetraacetate and 0.04 parts of sodium formaldehyde sulfoxylate were charged therein. The resulting mixture was copolymerized at a reaction temperature of 30° C. When a polymerization conversion reached substantially 100%, 0.5 part of N,N-diethylhydroxylamine was added to the reaction system to terminate the copolymerization reaction (reaction time: one hour). The reaction product (latex) was taken out, and an aqueous calcium chloride solution (0.25%) was added to the reaction product to coagulate an unsaturated group-containing acrylic rubber. The coagulate was thoroughly washed with water, and then dried at about 90° C. for 3 to 4 hours to obtain an unsaturated group-containing acrylic rubber having a Mooney viscosity [ML$_{1+4}$ (100° C.)] of 72 (hereinafter referred to as "ANM1").

SYNTHESIS EXAMPLE 1 AND COMPARATIVE SYNTHESI EXAMPLES 1 AND 2

ANM2 and ANM3 were obtained in the same manner as in Synthesis Example 1 by copolymerizing a monomer mixture as shown in Table 1. n-Butyl acrylate (BA) and methyl mmethacrylate (MMA) were further used for ANM3.

As comparative samples for comparison with the present invention, monomer mixtures as shown in Table 1 were each copolymerized to obtain ACM1 and ACM2, respectively, as an acrylic rubber that is not the component (B) of the present invention.

TABLE 1

|  | ANM1 | ANM2 | ANM3 | ACM1 | ACM2 |
|---|---|---|---|---|---|
| EA | 83.5 | 70 | 57 | 47.5 | 50 |
| BA |  |  | 10 | 47.5 | 30 |
| AN | 12.5 | 25 | 17 |  | 20 |
| MMA |  |  | 13 |  |  |
| DCPEA | 4 | 5 | 3 | 5 |  |
| Mooney viscosity | 60 | 98 | 110 | 62 | 70 |

(C) Compatibilizing Agent

Ethylene-ethyl acrylate copolymer (C1): trade name: "VAMAC-G", made by Show Denko Dupont K.K.

Acrylonitrile-butadiene rubber (C2): AN content: 20% by weight, trade name: "N250S", made by JSR Corporation Polypropylene glycol monomethacrylate (C3): trade name: "Blemmer PP1000", made by NOF Corporation Maleic anhdyride-modified ethylene-propylene rubber (C4): trade name: "Tafmer MP0610", made by Mitsui Chemicals, Inc.

(D) Inorganic Filler

Silica: trade name: "Nipsil NS", made by Nippon Silica Industrial Co., Ltd.

(E) Crosslinking Agent 2,5-Dimethyl-2,5-di(t-butyl peroxy)hexane: trade name: "Perhexa 25B-40", made by NOF Corporation 2,5-Dimethyl-2,5-di(t-butyl peroxy)hexine: trade name: "Perhexyne 25B-10", made by NOF Corporation (F) Plasticizer Trimellitic acid-based plasticizer: trade name: "Adekacizer C-79", made by Asahi Denka Co., Ltd.

Ether ester-based plasticizer: trade name: "Adekacizer RS735", made by Asahi Denka Co., Ltd.

Ether ester-based plasticizer: trade name: "Adekacizer RS 1003", made by Asahi Denka Co., Ltd.

(G) Exdender Oil

Naphthenic acid: trade name: "Fukkol Flex #2050N", made by Fuji Kosan Co., Ltd.

$C_A$ 6%, $C_N$ 39%, $C_P$ 55%

(H) Aromatic Oligomer

Coumarone-indene resin: trade name: "G-90", made by Shin-Nittetsu Chemical Co., Ltd.

Other Additives

Crosslinking aid (1): Divinylbenzene (purity: 56%), made by Sankyo Chemical Industries, Ltd.

Crosslinking aid (2): trade name: "TMPA", made by NOF Corporation

Antioxidant (1): 4,4'-(α,α'-Dimethylbenzyl) diphenylamine, trade name: "Nocrac CD", made by Ouchishinko Chemical Industrial Co., Ltd.

Antioxidant (2): Pentaerythrityl-tetrakis[3-(3,5-di-t-butyl-4-hydroxyphenyl)-propionate], trade name: "Irganox 1010", made by Ciba Specialty Chemicals Ltd.

Processing agent (1): Stearic acid, made by Kao Corporation

Processing agent (2): trade name: "Farmin 80", made by Kao Corporation

Lubricant: trade name: "PEG4000", made by NOF Corporation

Silane coupling agent: trade name: "TSL8370", made by Toshiba Silicone Co., Ltd.

EXAMPLE 1

20 parts of "PP1" as the olefin resin (A), 80 parts of "ANM1" as the unsaturated group-containing acryl rubber (B), 5 parts of "VAMAC-G" as the compatibilizing agent (C), 10 parts of "Nipsil NS" as the inorganic filler (D) and 20 parts of "Adekacizer RS735" as the plasticizer (F), together with 1.2 parts of the antioxidant, 1.5 parts of the processing agent, 0.5 part of the lubricant and 0.5 part of the silane coupling agent as other additives were introduced into a 10 liters double-arm pressurizing kneader (made by Moriyama Co., Ltd.) heated at 160° C. The mixture was kneaded at 40 rpm for 20 minutes. The composition in a molten state was pelletized by a feeder ruder (made by Moriyama Co., Ltd.) set at 180° C. and 40 rpm.

The pellets thus obtained were compounded with 3 parts of "Perhexa 25B-40" as the crosslinking agent and 9 parts of divinylbenzene (purity: 56%; 5 parts as divinylbenzene) as the crosslinking aid, followed by mixing with a Henschel mixer for 30 seconds. The mixture was then extruded while subjecting to a dynamic heat processing by using a twin-screw extruder (Model: "PCM-45", made by Ikegai Corporation; completely intermeshing screws in the same direction, with a ratio of a length L of screw flight section to a screw diameter D (L/D)=33.5) at 230° C. and at 300 rpm for a retention time of 2 minutes, to obtain a dynamic crosslinking type thermoplastic elastomer composition in a pellet form.

Preparation of Specimen of Thermoplastic Elastomer:

The pellets of the thermoplastic elastomer thus obtained were subjected to injection molding using an injection molding machine (trade name: N-100, made by The Japan Steel Works, Ltd.), to prepare a sheet having a thickness of 2 mm, a length of 120 mm, and a width of 120 mm, which was then provided for various evaluations.

Evaluation of Thermoplastic Elastomer:

The thermoplastic elastomer obtained was measured for kneading properties by a 10 liters kneader. Further, its fluidity was measured in terms of melt flow rate at 230° C. with a load of 10 kg. The results obtained are shown in Table 3.

The molded sheet of the thermoplastic elastomer obtained was evaluated for hardness, mechanical properties (tensile strength at break and tensile elongation at break), and oil resistance in the following manners. The results obtained are shown in Table 3.

(1) Hardness

Measured according to JIS-K6253 as a measure of flexibility.

(2) Tensile Strength at Break and Tensile Elongation at Break

Measured according to JIS-K6251.

(3) Oil Resistance

According to JIS-K-6258, a volume change ($\Delta V$) by the dipping test at 23° C. for 70 hours and a change in elongation strength in the tensile test were obtained using a Fuel C test oil.

(4) Heat Resistance

According to JIS-K-6257, the molded sheet was allowed to stand in a gear oven at 140° C. for 20 hours and then subjected to the tensile test, thereby measuring changes in tensile strength at break and tensile elongation at break and a change in hardness.

(5) Compression Set

According to JIS-K6262, the molded sheet was compressed at 120° C. for 22 hours to a degree of 25%, and a value was then measured.

(6) Low-temperature Test

According to JIS-K6261, the molded sheet was subjected to an impact brittleness test at −20° C., thereby examining the presence or absence of abnormality.

(7) Weather Resistance

According to JIS-K6259, the weather resistance was evaluated under a condition of a static 40% elongation in an ozone concentration of 500 pphm at 40° C. for 200 hours, thereby examining the presence or absence of cracks.

EXAMPLE 2 TO 10 AND COMPARATIVE EXAMPLES 1 TO 5

Crosslinking type thermoplastic elastomer compositions in a pellet form and specimens were obtained in the compounding ratios as shown in Table 2 in the same manner as in Example 1. In the case of Comparative Example 4, however, shrinkage was large and the specimen could not be obtained. Further, in the case of Comparative Example 5, pellets could not be obtained due to poor kneading properties in a kneader.

The evaluation results of the thermoplastic elastomer compositions obtained are shown in Table 3.

TABLE 2

|     |             | Example |    |     |    |    |    |     |     |    |    | Comparative Example |    |    |    |    |
|-----|-------------|---------|----|-----|----|----|----|-----|-----|----|----|------|----|----|----|----|
|     |             | 1       | 2  | 3   | 4  | 5  | 6  | 7   | 8   | 9  | 10 | 1    | 2  | 3  | 4  | 5  |
| (A) | PP1         | 20      | 20 | 20  | 20 | 30 | 30 | 20  | 20  | 20 | 20 | 20   | 20 | 20 | 20 | 20 |
| (B) | ANM1        | 80      |    | 80  | 80 | 70 | 70 | 80  |     | 80 | 80 |      |    |    | 80 | 80 |
|     | ANM2        |         | 80 |     |    |    |    |     |     |    |    |      |    |    |    |    |
|     | ANM3        |         |    |     |    |    |    |     | 80  |    |    |      |    |    |    |    |
|     | ACM1        |         |    |     |    |    |    |     |     |    |    | 80   |    |    |    |    |
|     | ACM2        |         |    |     |    |    |    |     |     |    |    |      | 80 |    |    |    |
| (C) | VAMAC-G     | 5       | 5  | 2.5 |    |    |    |     |     |    |    | 5    |    | 40 | 5  | 5  |
|     | N250S       |         |    | 2.5 | 5  |    |    | 5   | 5   | 5  | 5  |      | 5  | 40 |    |    |
|     | Blemmer PP1000 |      |    |     |    | 5  |    |     |     |    |    |      |    |    |    |    |
|     | Tafmer MP0610 |       |    |     |    |    | 5  |     |     |    |    |      |    |    |    |    |
| (D) | Nipsil NS   | 10      | 10 | 10  | 5  | 5  | 10 | 20  | 20  | 20 | 20 | 10   | 10 | 10 | 10 |    |
| (E) | Perhexa 25B-40 | 3    | 3  | 3   | 3  | 3  | 3  |     |     | 3  | 3  | 3    | 3  | 3  |    | 3  |
|     | Perhexyne 25B-40 |   |    |     |    |    |    | 1.5 | 1.5 |    |    |      |    |    |    |    |

TABLE 2-continued

|  |  | Example |  |  |  |  |  |  |  |  |  | Comparative Example |  |  |  |  |
|---|---|---|---|---|---|---|---|---|---|---|---|---|---|---|---|---|
|  |  | 1 | 2 | 3 | 4 | 5 | 6 | 7 | 8 | 9 | 10 | 1 | 2 | 3 | 4 | 5 |
| (F) | C-79 | 10 | 10 | 10 | 10 | 5 | 10 | 10 | 10 | 10 | 10 | 10 | 10 | 10 | 10 | 10 |
|  | RS735 | 20 | 20 | 20 | 20 | 25 | 20 | 10 | 10 | 10 | 10 | 20 | 20 | 20 | 20 | 20 |
|  | RS1000 |  |  |  |  |  |  | 20 | 30 | 30 | 30 |  |  |  |  |  |
| (G) | 2050N |  |  |  |  |  | 10 |  |  |  |  |  |  |  |  |  |
| (H) | Coumarone-indene resin |  |  |  |  |  |  |  |  | 5 |  |  |  |  |  |  |
| Antioxidant | Nocrac CD | 1 | 1 | 1 | 1 | 1 | 1 | 1 | 1 | 1 | 1 | 1 | 1 | 1 | 1 | 1 |
|  | Irganox 1010 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Processing | Stearic acid | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| agent | Farmin 80 | 1 | 1 | 1 | 1 | 1 | 1 | 1 | 1 | 1 | 1 | 1 | 1 | 1 | 1 | 1 |
| Lubricant | PEG4000 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Crosslinking aid | Divinylbenzene | 9 | 9 | 9 | 9 |  | 6 | 4 | 4 | 4 | 4 | 9 | 9 | 9 |  | 9 |
|  | TMPA |  |  |  |  | 3 |  |  |  |  |  |  |  |  |  |  |
| Silane coupling agent | TSL8370 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

TABLE 3

|  | Example |  |  |  |  |  |  |  |  |  | Comparative Example |  |  |  |  |
|---|---|---|---|---|---|---|---|---|---|---|---|---|---|---|---|
|  | 1 | 2 | 3 | 4 | 5 | 6 | 7 | 8 | 9 | 10 | 1 | 2 | 3 | 4 | 5 |
| Kneading properties by 10-liters kneader | Good | Good | Good | Good | Good | Good | Good | Good | Good | Good | Good | Good | Good | Good | Bad |
| MFR (g/10 min.) | 20 | 18 | 22 | 25 | 17 | 15 | 25 | 29 | 21 | 19 | 12 | 15 | 18 | 3 |  |
| Skin appearance | Good | Good | Good | Good | Good | Good | Very good | Good | Very good | Good | Good | Good | Good | Poor | Bad |
| Physical properties |  |  |  |  |  |  |  |  |  |  |  |  |  |  |  |
| Tensile strength at break (MPa) | 7.2 | 8.5 | 9.2 | 9.5 | 8.8 | 8.5 | 11.5 | 8.8 | 10.5 | 11.2 | 4.5 | 3.5 | 7.5 | *1 | *2 |
| Tensile elongation at break (%) | 350 | 400 | 420 | 400 | 380 | 400 | 400 | 380 | 420 | 420 | 350 | 280 | 420 |  |  |
| Hardness (Duro A) | 77 | 76 | 75 | 78 | 77 | 79 | 77 | 60 | 75 | 78 | 75 | 75 | 72 |  |  |
| Compression set (%) | 35 | 33 | 35 | 43 | 42 | 43 | 43 | 42 | 42 | 43 | 45 | 60 | 50 |  |  |
| Oil resistance (Fuel C at 23° C. for 70 hours) |  |  |  |  |  |  |  |  |  |  |  |  |  |  |  |
| Sc (TB) (%) | −43 | −38 | −40 | −45 | −45 | −40 | −40 | −36 | −40 | −38 | −80 | −70 | −85 |  |  |
| Sc (EB) (%) | −40 | −42 | −40 | −43 | −40 | −38 | −43 | −25 | −38 | −38 | −60 | −65 | −75 |  |  |
| $C_H$ (point) | −15 | −16 | −16 | −14 | −15 | −12 | −15 | −13 | −14 | −12 | −30 | −35 | −40 |  |  |
| ΔV (%) | 22 | 23 | 24 | 25 | 28 | 25 | 25 | 15 | 23 | 23 | 45 | 40 | 75 |  |  |
| Heat resistance (at 150° C. for 70 hours) |  |  |  |  |  |  |  |  |  |  |  |  |  |  |  |
| Ac (TB) (%) | −5 | 5 | −2 | 3 | −7 | 2 | 2 | 5 | 0 | 3 | −10 | 3 | −40 |  |  |
| Ac (EB) (%) | 0 | −2 | 3 | 8 | 2 | 0 | 8 | 2 | 2 | 2 | −20 | −10 | −65 |  |  |
| $A_H$ (point) | 0 | 2 | 1 | 2 | 1 | 1 | 1 | 2 | 2 | 2 | 2 | 1 | 20 |  |  |
| Low-temperature test (Impact brittleness test) |  |  |  |  |  |  |  |  |  |  |  |  |  |  |  |
| Appearance | No abnormality |  |  |  |  |  |  |  |  |  |  |  |  |  |  |
| Weather resistance (Ozone degradation test: 50 ppm, 40° C., static 40% elongation, 200 hours) |  |  |  |  |  |  |  |  |  |  |  |  |  |  |  |
| Appearance | No crack |  |  |  |  |  |  |  |  |  |  |  |  |  |  |

Notes:
*1: Sheet shrinkage was large and good sheet molding was not obtained. Therefore, evaluations could not be made.
*2: Pelletization could not be made due to poor kneading, and samples for evaluation could not be prepared.

It can be understood from Table 3 that Examples 1 to 10 are excellent in heat aging characteristics, weather resistance, low-temperature physical properties and oil resistance. In the acrylic rubber (ACM1) of Comparative Example 1, since a structural unit derived from the unsaturated acrylonitrile monomer is not copolymerized, the resulting composition is poor in oil resistance and tensile strength, both of which are characteristic features of the present invention. In the acrylic rubber (ACM2) of Comparative Example 2, since a structural unit derived from a monomer having a carbon-carbon double bond in a side chain thereof is not copolymerized, the resulting composition is poor in tensile strength and compression set. In Comparative Example 3, an acrylonitrile-butadiene-based rubber and an ethylene-acrylic acid ester copolymer rubber are used as the rubber component in place of the unsaturated group-containing acrylic rubber of the present invention. In this case, the resulting composition is poor in oil resistance and heat resistance. In Comparative Example 4, the kneading is carried out in the absence of a crosslinking agent. As a result, a good molding was not obtained, and it was impossible to evaluate the physical properties. In Comparative Example 5, since the component (D) was not contained, sticking during the kneading was so vigorous that the kneading could not be carried out.

The thermoplastic elastomer composition according to the present invention has excellent heat aging characteristic, weather resistance, low-temperature physical properties and oil resistance. Therefore, the composition can suitably be used for various hoses where the oil resistance and heat resistance are required, such as oil-resistant hoses for fuel oil or lubricant system, oil cooler hoses, air duct hoses, power steering hoses, control hoses, inter cooler hoses, torque converter hoses, oil return hoses, vacuum sensing hoses, and heat-resistant hoses.

It should further be apparent to those skilled in the art that various changes in form and detail of the invention as shown and described above may be made. It is intended that such changes be included within the spirit and scope of the claims appended hereto.

This application is based on Japanese Patent Application No. 2001-316441 filed Oct. 15, 2001, the disclosure of which is incorporated herein by reference in its entirety.

What is claimed is:

1. A thermoplastic elastomer composition obtained by dynamically heat treating a mixture comprising (A) an olefin resin, (B) an unsaturated group-containing acrylic rubber and (D) an inorganic filler in the presence of (E) a crosslinking agent, wherein the component (B) comprises:

(B1) from 55 to 94.99% by weight of a structural unit derived from an acrylic acid alkyl ester monomer and/or an acrylic acid alkoxyalkyl ester monomer, (B2) from 0.01 to 20% by weight of a structural unit derived from a monomer having a carbon-carbon double bond in a side chain thereof, (B3) from 5 to 30% by weight of a structural unit derived from an unsaturated acrylonitrile monomer, and (B4) from 0 to 30% by weight of a structural unit derived from a monomer copolymerizable with (B1), (B2) and (B3), provided that the sum of (B1), (B2), (B3) and (B4) is 100% by weight.

2. The thermoplastic elastomer composition as claimed in claim 1, wherein the olefin resin (A) is a propylene resin.

3. The thermoplastic elastomer composition as claimed in claim 1, wherein the inorganic filler (D) is silica.

4. The thermoplastic elastomer composition as claimed in claim 1, further comprising (C) a compatibilizing agent.

5. The thermoplastic elastomer composition as claimed in claim 4, wherein the compatibilizing agent (C) is at least one member selected from the group consisting of an ethylene-acrylic acid ester copolymer, a functional group-containing polyolefin and a polyolefin glycol (meth)acrylate.

6. The thermoplastic elastomer composition as claimed in claim 1, further comprising (F) a plasticizer having a molecular weight of from 400 to 1,000.

7. The thermoplastic elastomer composition as claimed in claim 1, further comprising (G) an extender oil.

8. The thermoplastic elastomer composition as claimed in claim 1, further comprising (H) an aromatic oligomer.

9. A molding using a thermoplastic elastomer composition obtained by dynamically heat treating a mixture comprising (A) an olefin resin, (B) an unsaturated group-containing acrylic rubber and (D) an inorganic filler in the presence of (E) a crosslinking agent, wherein the component (B) comprises:

(B1) from 55 to 94.99% by weight of a structural unit derived from an acrylic acid alkyl ester monomer and/or an acrylic acid alkoxyalkyl ester monomer, (B2) from 0.01 to 20% by weight of a structural unit derived from a monomer having a carbon-carbon double bond in a side chain thereof, (B3) from 5 to 30% by weight of a structural unit derived from an unsaturated acrylonitrile monomer, and (B4) from 0 to 30% by weight of a structural unit derived from a monomer copolymerizable with (B1), (B2) and (B3), provided that the sum of (B1), (B2), (B3) and (B4) is 100% by weight.

10. The molding as claimed in claim 9, wherein the olefin resin (A) is a propylene resin.

11. The molding as claimed in claim 9, wherein the inorganic filler (D) is silica.

12. The molding as claimed in claim 9, wherein the thermoplastic elastomer composition further comprises (C) a compatibilizing agent.

13. The molding as claimed in claim 12, wherein the compatibilizing agent (C) is at least one member selected from the group consisting of an ethylene-acrylic acid ester copolymer, a functional group-containing polyolefin and a polyolefin glycol (meth)acrylate.

14. The molding as claimed in claim 9, wherein the thermoplastic elastomer composition further comprises (F) a plasticizer having a molecular weight of from 400 to 1,000.

15. The molding as claimed in claim 9, wherein the thermoplastic elastomer composition further comprises (G) an extender oil.

16. The molding as claimed in claim 9, wherein the thermoplastic elastomer composition further comprises (H) an aromatic oligomer.

17. A hose comprising the molding as claimed in claim 9.

18. The thermoplastic elastomer composition as claimed in claim 2, further comprising a compatibilizing agent (C).

19. The thermoplastic elastomer composition as claimed in claim 18, wherein the inorganic filler (D) is silica.

20. The thermoplastic elastomer composition as claimed in claim 19, further comprising an extender oil (G).

* * * * *